United States Patent
Hasmanis et al.

(10) Patent No.: US 7,502,453 B1
(45) Date of Patent: Mar. 10, 2009

(54) AUTOMATED EVENT ORDERING SYSTEM AND METHOD

(75) Inventors: Steven Paul Hasmanis, Alpharetta, GA (US); Michael Alan Rosenwasser, Alpharetta, GA (US); Ronald M. Stephenson, Alpharetta, GA (US)

(73) Assignee: Cox Communications, Inc., Alpharetta, GA (US)

( * ) Notice: Subject to any disclaimer, the term of this patent is extended or adjusted under 35 U.S.C. 154(b) by 509 days.

(21) Appl. No.: 09/631,076

(22) Filed: Aug. 2, 2000

(51) Int. Cl.
*H04M 11/00* (2006.01)
*H04N 7/173* (2006.01)

(52) U.S. Cl. .............................. 379/102.03; 379/93.12; 725/104

(58) Field of Classification Search .................. 725/98, 725/104; 1/99; 379/88.04, 204.14, 142.06, 379/102.03, 114.19, 91.02, 93.12
See application file for complete search history.

(56) References Cited

U.S. PATENT DOCUMENTS

| | | | |
|---|---|---|---|
| 2,769,023 A | 10/1956 | Loew et al. | |
| 2,843,654 A | 7/1958 | Gottfried et al. | |
| 3,021,383 A | 2/1962 | Mountjoy et al. | |
| 3,172,948 A | 3/1965 | Rubenstein | |
| 3,396,232 A | 8/1968 | Hendrickson | |
| 3,751,670 A | 8/1973 | Grodner et al. | |
| 3,769,579 A | 10/1973 | Harney | |
| 3,920,908 A | 11/1975 | Kraus | 179/2 CA |
| 4,536,791 A | 8/1985 | Campbell et al. | |
| 4,710,955 A | 12/1987 | Kauffman | |
| 4,763,191 A | 8/1988 | Gordon et al. | 358/86 |
| 4,792,968 A | 12/1988 | Katz | 379/92 |
| 4,845,739 A | 7/1989 | Katz | 379/92 |
| 4,852,154 A * | 7/1989 | Lewis et al. | 379/93.12 |
| 4,893,248 A | 1/1990 | Pitts et al. | |
| 4,897,867 A | 1/1990 | Foster et al. | 379/94 |
| 4,930,150 A | 5/1990 | Katz | 379/93 |
| 4,932,046 A | 6/1990 | Katz et al. | 379/32 |
| 4,939,773 A | 7/1990 | Katz | 379/204 |
| 4,975,945 A | 12/1990 | Carbullido | 379/212 |
| 4,987,590 A | 1/1991 | Katz | 379/204 |
| 5,014,298 A | 5/1991 | Katz | 379/93 |
| 5,016,270 A | 5/1991 | Katz | 379/92 |
| 5,048,075 A | 9/1991 | Katz | 379/92 |

(Continued)

OTHER PUBLICATIONS

Bowling, Tom, Pay TV: a pay-per-minute system prototype, Bowling of Bell-Northern Research, Mar./Apr. 1984, pp. 79-83, Canada.

(Continued)

*Primary Examiner*—Fan Tsang
*Assistant Examiner*—Simon Sing
(74) *Attorney, Agent, or Firm*—Standley Law Group LLP

(57) ABSTRACT

A system for ordering events comprising a switch for receiving calls, the switch adapted to receive the caller's calling number and the called number; an interactive voice response unit for providing recorded voice response, the interactive voice response unit configured with multiple applications; a data storage component configured with customer information and event information, said customer information including account number and calling number data and the event information including event title; a temporary data container for storing customer data received from the data storage component for use in call processing; and wherein the system is configured to retrieve the customer data from the data storage component based on the calling number and to store the customer data in the temporary data container for use in subsequent call processing applications.

10 Claims, 15 Drawing Sheets

U.S. PATENT DOCUMENTS

| | | | | |
|---|---|---|---|---|
| 5,073,929 | A | 12/1991 | Katz | 379/93 |
| 5,091,933 | A | 2/1992 | Katz | 379/204 |
| 5,109,404 | A | 4/1992 | Katz et al. | 379/88 |
| 5,128,984 | A | 7/1992 | Katz | 379/92 |
| 5,151,782 | A * | 9/1992 | Ferraro | 725/66 |
| 5,163,087 | A * | 11/1992 | Kaplan | 379/93.03 |
| 5,185,787 | A | 2/1993 | Katz | 379/204 |
| 5,218,631 | A | 6/1993 | Katz | 379/88 |
| 5,224,153 | A | 6/1993 | Katz | 379/93 |
| 5,251,252 | A | 10/1993 | Katz | 379/92 |
| 5,255,309 | A | 10/1993 | Katz | 379/88 |
| 5,259,023 | A | 11/1993 | Katz | 379/88 |
| 5,297,197 | A | 3/1994 | Katz | 379/204 |
| 5,345,501 | A * | 9/1994 | Shelton | 379/88.2 |
| 5,349,633 | A | 9/1994 | Katz | 379/88 |
| 5,351,285 | A | 9/1994 | Katz | 379/94 |
| 5,359,645 | A | 10/1994 | Katz | 379/93 |
| 5,365,575 | A | 11/1994 | Katz | 379/92 |
| 5,442,688 | A | 8/1995 | Katz | 379/156 |
| 5,495,284 | A | 2/1996 | Katz | 348/15 |
| 5,497,420 | A * | 3/1996 | Garneau et al. | 380/240 |
| 5,553,120 | A | 9/1996 | Katz | 349/88 |
| 5,561,707 | A | 10/1996 | Katz | 379/88 |
| 5,684,863 | A | 11/1997 | Katz | 379/88 |
| 5,787,156 | A | 7/1998 | Katz | 379/93.13 |
| 5,790,174 | A * | 8/1998 | Richard et al. | 725/99 |
| 5,793,846 | A | 8/1998 | Katz | 379/88 |
| 5,815,551 | A | 9/1998 | Katz | 379/88 |
| 5,828,734 | A | 10/1998 | Katz | 379/93.13 |
| 5,828,845 | A * | 10/1998 | Jagadish et al. | 709/229 |
| 5,835,576 | A | 11/1998 | Katz | 379/93.13 |
| 5,898,762 | A | 4/1999 | Katz | 379/93.12 |
| 5,905,942 | A * | 5/1999 | Stoel et al. | 725/78 |
| 5,914,712 | A * | 6/1999 | Sartain et al. | 725/9 |
| 5,917,893 | A | 6/1999 | Katz | 379/93.02 |
| 5,974,120 | A | 10/1999 | Katz | 379/93.13 |
| 6,016,344 | A | 1/2000 | Katz | 379/260 |
| 6,035,021 | A | 3/2000 | Katz | 379/93.12 |
| 6,044,135 | A | 3/2000 | Katz | 379/93.13 |
| 6,055,513 | A | 4/2000 | Katz et al. | 705/26 |
| 6,061,433 | A * | 5/2000 | Polcyn et al. | 379/93.12 |
| 6,148,065 | A | 11/2000 | Katz | |
| 6,151,387 | A | 11/2000 | Katz | |
| 6,157,711 | A | 12/2000 | Katz | |
| 6,160,989 | A * | 12/2000 | Hendricks et al. | 725/36 |
| 6,209,028 | B1 * | 3/2001 | Walker et al. | 709/219 |
| 6,292,547 | B1 | 9/2001 | Katz | |
| 6,335,965 | B1 | 1/2002 | Katz | |
| 6,349,134 | B1 | 2/2002 | Katz | |
| 6,424,703 | B1 | 7/2002 | Katz | |
| 6,434,223 | B2 | 8/2002 | Katz | |
| 6,449,346 | B1 | 9/2002 | Katz | |
| 6,512,415 | B1 | 1/2003 | Katz | |
| 6,570,967 | B2 | 5/2003 | Katz | |
| 6,678,360 | B1 | 1/2004 | Katz | |

OTHER PUBLICATIONS

Sirazi et al, Comparative Study of Hybrid-IPPV Implementations, Zenith Electronics Corporation, Jun. 1985, pp. 1-7.

Bulfer, Andrew F., Miller, Mathew D., Frank Nancy, A Trial of National Pay-Per-View Ordering and Billing System, Jun. 1986, 6 pages.

Moccardi, Sal, Doing Business by Phone-Request TV-Interactive Television, Inbound/Outbound, Jun. 1988, pp. 16-17.

* cited by examiner

Figure 5

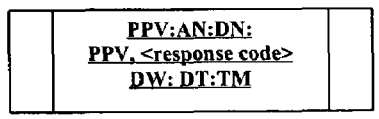

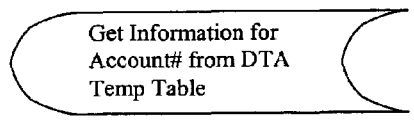

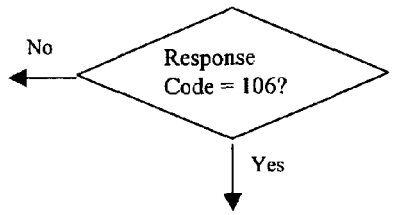

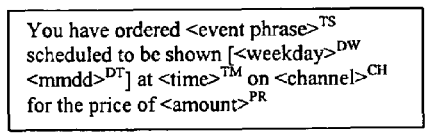

Caller Flowchart Legend

Start/End
Indicates the starting or ending point of an application or sub-process.

DATA SERVER Transactions
Top line (bold, italics, underlined) represents transaction tokens sent from IVR to data server.
Bottom lines (bold) represents response code and transaction tokens returned from data server to IVR.

Database Access
Indicates table being accessed, search criteria, and being retrieved.

Decision Points
Indicate a branch in logic based on evaluation of some criteria. Text in the arrows will indicate decision path criteria.

Spoken Phrases
Text in italics is prerecorded and static.
Text in <brackets> is variable, based on data returned from data server.
Superscript value next to variable data indicates the data server token containing the response.

Connector
Indicates a connection to another page or another point in the flowchart.

AUTOMATED EVENT ORDERING SYSTEM AND METHOD

BACKGROUND AND SUMMARY OF THE INVENTION

The present invention relates to a system and method for routing and processing telephone calls. More particularly, the present invention relates to method and system for using data stored in the system and/or supplied by the caller to route calls and to process calls for specific tasks, including, but not limited to, cable program ordering.

Automated telephone call centers have been known previously for the use of cable program ordering. The present invention provides a robust, automated, telephone system providing novel use of existing customer information, delegation of job duties between multiple components and component communication. The present system also provides the use of temporary data containers for the routing and processing of telephone calls to accomplish a myriad of functions including caller verification, account information look-up and cable program ordering.

The present invention is preferably comprised of a switch for receiving calls, the switch adapted to receive the caller's calling number and the called number; an interactive voice response unit for providing recorded voice response, the interactive voice response unit configured with multiple applications; a data storage component configured with customer information and event information, the customer information including account number and calling number data and the event information including event title; a temporary data container for storing customer data received from the data storage component for use in call processing; and wherein the system is configured to retrieve the customer data from the data storage component based on the calling number and to store the customer data in the temporary data container for use in subsequent call processing applications In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIG. 5 illustrates a legend for the flowcharts of FIGS. 3A-3C and 4A-4G.

DETAIL DESCRIPTION OF PREFERRED EMBODIMENT(S)

The preferred system herein described is not intended to be exhaustive or to limit the invention to the precise forms disclosed. They are chosen and described to explain the principles of the invention and the application of the method to practical uses so that others skilled in the art may practice the invention.

Figure 1:
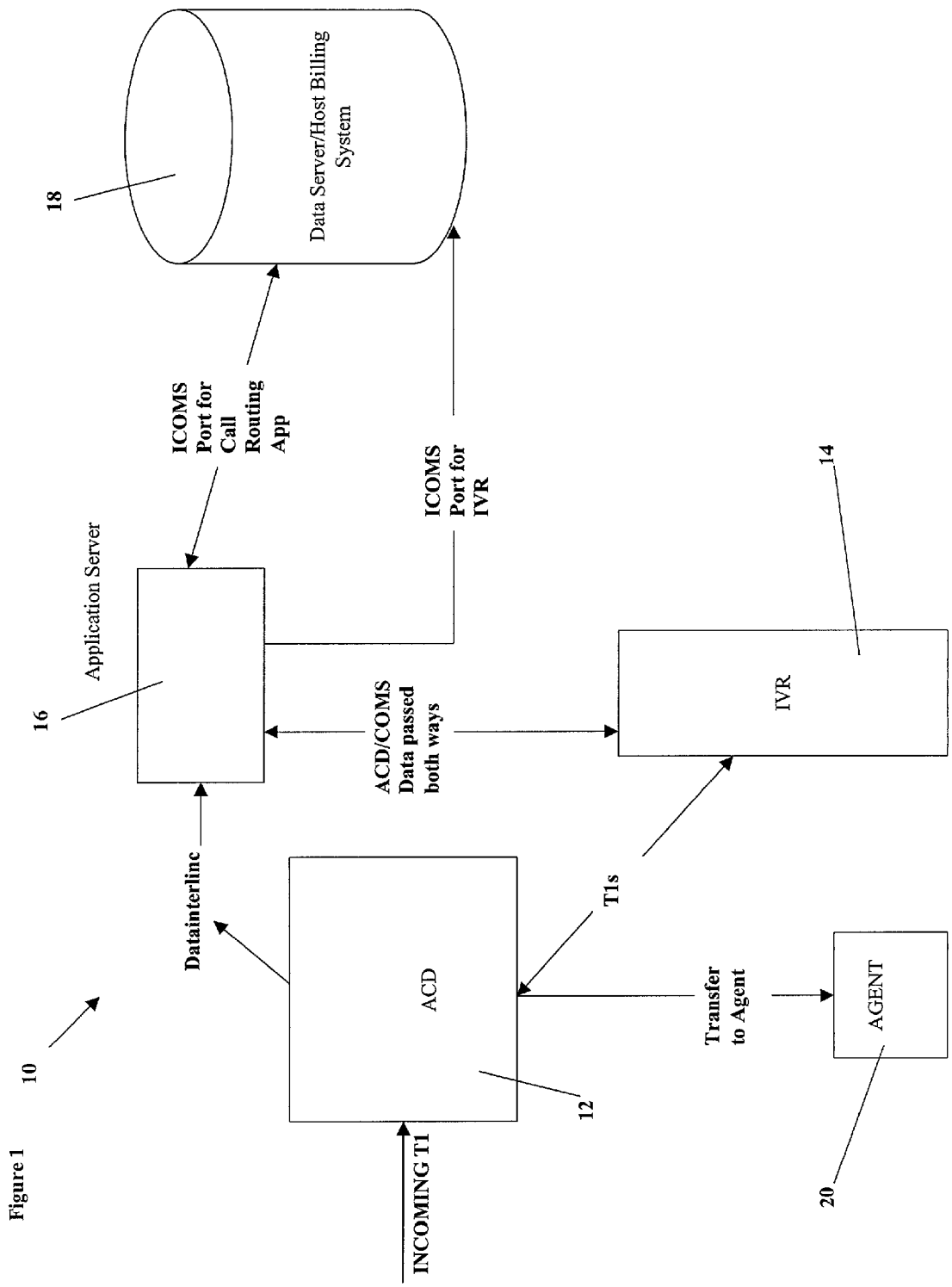
FIG. 1 illustrates a block diagram illustrating the main components of a preferred embodiment of the present invention.

FIG. 1 illustrates a block diagram illustrating the main components of a preferred embodiment of the present invention. The system 10 is preferably comprised of a telephone switch 12; an interactive voice response (IVR) unit 14, also known as a voice response unit (VRU) or an automated response unit (ARU); a local server 16 housing a local database; a CTI server and a data server 18 for storing customer and event data; and an agent station 20.

The telephone switch may be a PBX or ACD programmed to perform the functions as set forth below. The telephone switch has incoming trunks and lines for accepting telephone calls and may be programmed to route calls. The IVR is a processing unit for playing automated voice messages to the caller as determined by programmed scripts. The local server is a special function computer programmed with database and CTI software and programmed according to the present invention as discussed herein. The data server is also a computer, such as an AS400 computer, programmed according to the present invention discussed herein.

Figure 2A:
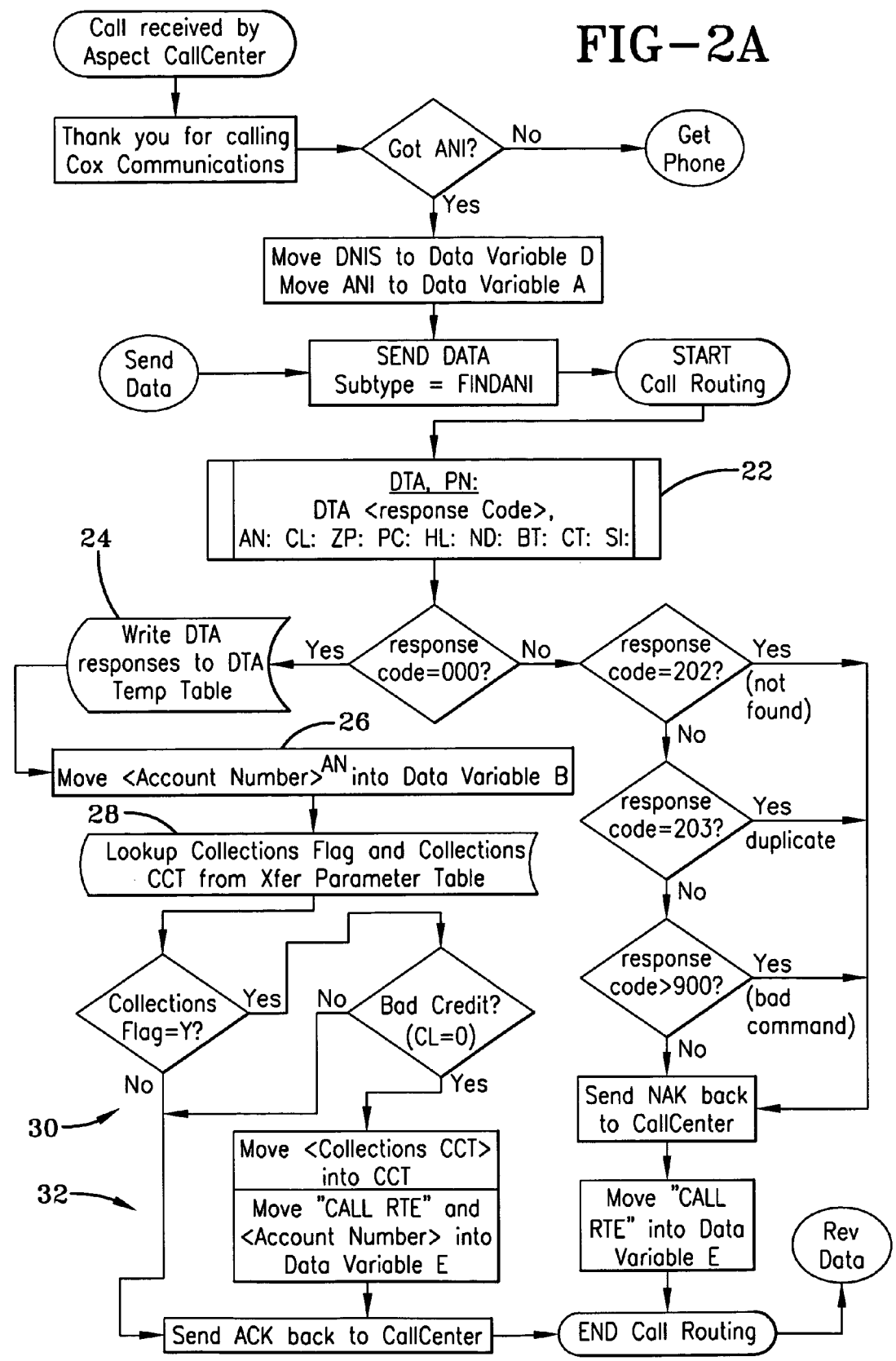
FIGS. 2A-2C illustrate a call flow of one embodiment of the initial call control and call routing applications of the present invention.
Figure 2B:
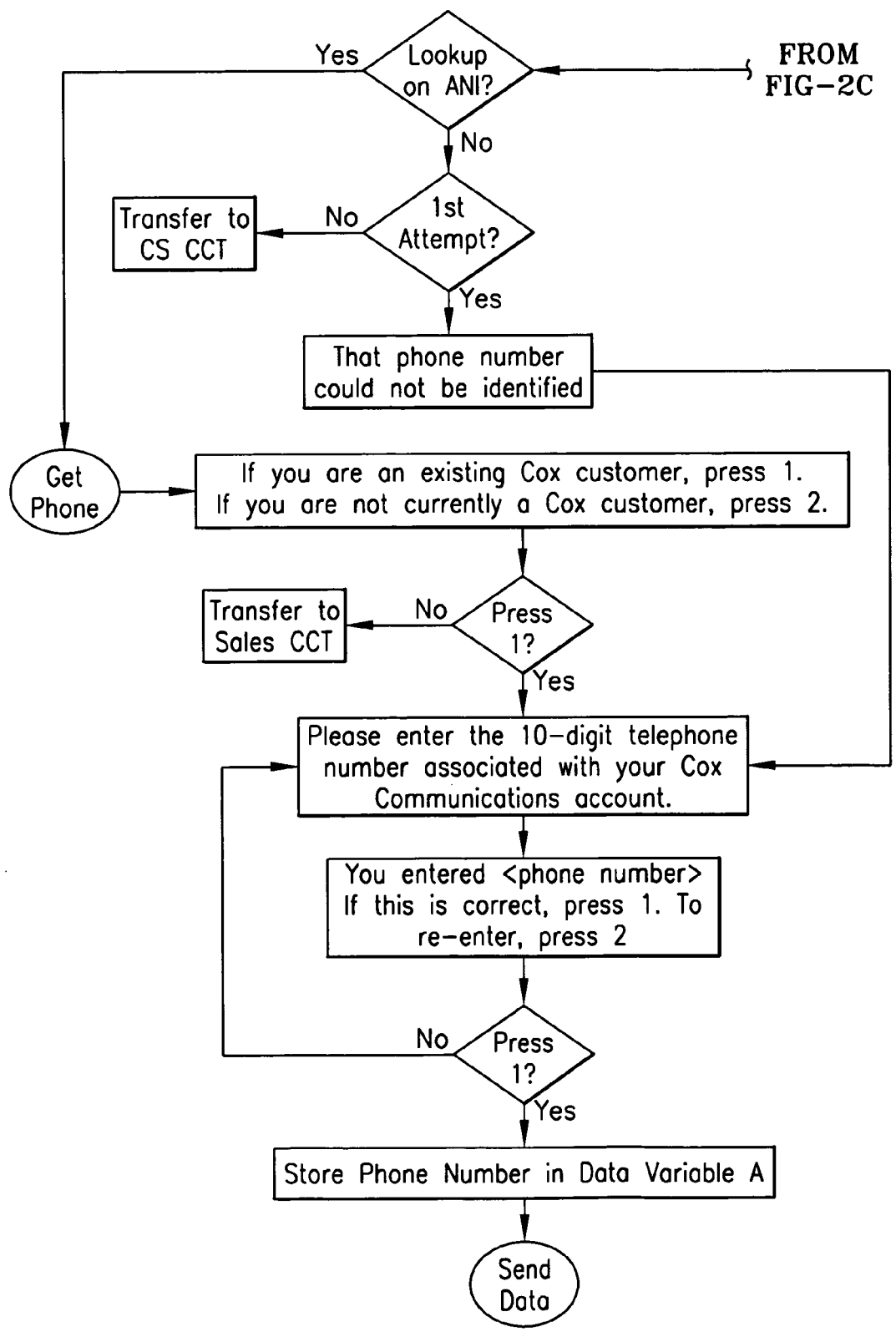

Upon calling a predetermined number (i.e., called number, dialed number identification service (DNIS)) a called number table is referenced by the switch to determine the initial call control process (implemented via tables resident on the switch, i.e., call control tables (CCT)). In the preferred embodiment of the present invention, the initial call control process will call the call routing application of the present invention, which evaluates the calling number provided with the call (i.e., ANI or caller telephone number) or a telephone number entered by the caller, and associates it with a customer account number. The call routing application of the present invention is preferably implemented via a program resident on the IVR. FIGS. 2A and 2B illustrate a call flow of one embodiment of the initial call control and call routing applications of the present invention.

The shaded portions of FIGS. 2A and 2B illustrate the logic executed by the initial call control process. The unshaded portions represents the call routing application of the IVR. The initial call control process obtains the calling party's telephone number, either automatically or by prompting the caller for it. The caller's number and the called number are each stored in data variables. These data variables store predetermined data for the duration of the call and are passed between the system components through data bridges. As one example, the following data may be stored in the following data variables:

| | |
|---|---|
| Data Variable A: | Caller Phone Number |
| Data Variable B: | Account Number |
| Data Variable C: | Miscellaneous Data |
| Data Variable D: | Called Number |
| Data Variable E: | Data for Display on Agent Workstation upon Transfer. |

Once the phone number of the calling party is obtained, the call routing application on the IVR is started (the initial call control process will send the ANI of the caller to the IVR via Data Variable A and send a command to start the call routing application).

During the call routing application, the IVR will interact with several data sources:
1.) local database;
2.) data server having customer and event information; and
3.) event voice files.

In an alternate embodiment, the voice files may be stored with the local database or the data server. A transaction with the data server is conducted to retrieve customer data. One example of a data server is the ICOMS database interface program resident on an AS400 computer; the ICOMS databases interface is a known cable-industry database. The IVR may communicate with the data server using various data interfaces, for example, sockets over TCP/IP. In one embodiment the data protocol between the IVR and the data server is a synchronous message protocol that consists of instruction strings and data strings in response. The following tables illustrate an example transaction format between the IVR and the data server:

Transaction Format

| Title | Length | Type | Description |
|---|---|---|---|
| Source Identifier | 1 | char | A = ARU<br>I = ICOMS |
| Line Number | 3 | digit | Right justified, zero filed<br>001-999 = the line number the user is calling in on<br>000 = Administrative function |
| Transaction Type | 3 | char | Indicates type of function being performed. It is followed by a comma (,). |
| Response Code | 3 | digit | Only on an ICOMS Response Transaction (Source ID-I) followed by a comma (,). |
| Data String | Variable | | Series of data fields and instruction fields separated by commas (,).<br>A data field is:<br>Data Token (2 char) followed by a colon (☺)<br>Data Value (varies in size and type by Data Token)<br>An Instruction field is:<br>Instruction Token (2 char) with no following Data Value. |
| Period | 1 | char | (.) |
| Carriage Return | 1 | byte | Hexadecimal 0D |

The fields used by the IVR for the PPV ordering application are indicated in bold. See FIGS. 3A-3C and 4A-4G.

Transaction Types

| Token | Description |
|---|---|
| ACK | Acknowledge-required every 30-45 seconds to maintain connectivity to ICOMS |
| APP | Appointment Confirmation |
| BAL | Account Balance Inquiry |
| CAN | Cancel-optional transaction used to recover from a "lost" state |
| CMP | Complete Work Order |
| CRD | Credit Authorization |
| DTA | Data Request |
| EQP | Equipment Check-In/Out/Swap |
| HIT | Converter Reauthorization |
| ITT | Interactive Transaction |
| NPD | Non Pay Disconnect Converter Reauthorization |
| OUT | Outage Verification |
| PIN | PIN Number Request |
| PPV | Pay Per View Order |
| PVI | Pay Per View Information Request |
| UPG | Service Upgrade |

Data Transaction Token

| Token | Length | Type | A = ARU<br>I = ICOMs | Description |
|---|---|---|---|---|
| AN | 9 | digit | A | Subscriber account number (right justified, zero filled) |
| CH | 9 | digit | I | Event Channel Number |
| DN | 4 | digit | A | DNIS (Phone number customer called in to) |
| DT | 7 | digit | A, I | Date—CYYMMDD C = Century Code; Y = Year; MM = Month; DD = Day |
| DW | 1 | char | I | Day of Week—1 = Sunday; 2 = Monday; . . . , 7 = Saturday |
| P# | 4 | char | A | Customer PIN number |
| PT | 2 | char | I | 7 digits (99999.99) followed by a sign field (- = credit) |
| RV | 2 | digit | I | Rating Value |
| TM | 4 | digit | A, I | Time of Day: HHMM HH = Hour; MM = Minute |
| TS | 11 | char | A | PPV Title Code and Showing Number (6 char & 5 digit) |

Response Codes

| Code | Description |
|---|---|
| 000 | Transaction Successful |
| 001 | Update (UP) required to perform request |
| 101 | Account Number (AN:) required |
| 102 | Phone Number (PN:) required |
| 106 | PIN (P#:) required |
| 108 | Event Number (EV:) required |
| 201 | Account Number (AN:) not found |
| 202 | Phone Number (PN:) not found |
| 203 | Duplicate Phone Number (PN:) found |
| 204 | Invalid PIN (P#:)—possible response on any transaction with P# |
| 205 | Account is not active |
| 206 | Account failed credit check |
| 209 | PIN# is not valid for event rating |
| 215 | No addressable equipment for account |
| 220 | Event Number (EV:) not found |
| 222 | Invalid DNIS (DN:) |
| 223 | No open window for pay per view order |
| 226 | Pay per view cannot be ordered for a customer with multiple converters |
| 227 | Pay per view is restricted for this customer |
| 228 | No events available for inquired category |
| 242 | Channel is restricted |
| 243 | Event already ordered |
| 901 | Invalid syntax (missing comma, colon, or period) |
| 902 | Unknown Transaction Type |
| 903 | Unknown Data Token |
| 904 | Invalid Source Identifier |
| 905 | Invalid Data Token for this Transaction Type |
| 907 | Invalid Data Value for Data Token |
| 910 | Account Number/Phone Number passed, not numeric |

As part of the call routing application, the IVR sends a data request to the data server along with the calling customer's telephone number 22. The data server looks up the customer information and sends it back to the IVR to be saved in a temporary storage container (e.g., table) 24 for use during the remainder of the call. In one embodiment, the temporary storage container holds the following data:

DTA Temp Table

| Field Name | Data Type | Description |
|---|---|---|
| Start Time Stamp | Date & Time | Date and time the call began |
| DNIS | Char(7) | DNIS associated with the call |
| Call ID | Char(4) | CallCenter call ID for cross-reference |
| Phone Number | Char(10) | ANI or phone number entered by the caller |
| Account Number | Char(9) | AN value provided on successful DTA transaction |
| Credit Limit | Char(10) | CL value provided on successful DTA transaction |

| DTA Temp Table | | |
|---|---|---|
| Field Name | Data Type | Description |
| Zip Code | Char(9) | ZP value provided on successful DTA transaction |
| PPV Capable | Char(3) | PC value provide on successful DTA transaction |
| House Locator Codes | Char(8) | HL value provided on successful DTA transaction |
| Node ID | Char(5) | ND value provided on successful DTA transaction |
| Customer Billing Type | Char(1) | BT value provided on successful DTA transaction |
| Category Totals | Char(15) | CT value provided on successful DTA transaction |
| Site ID | Char(3) | SI value provided on successful DTA transaction |
| Last Activity* | Char(8) | corresponds to last FFFFFFFF from Winset display |
| Last Response* | Char(3) | corresponds to last ICOMS response code |
| End Time Stamp* | Date&Time | Date and time the call ended |

The retrieved account number is moved into Data Variable B 26. An Application Parameter Table, such as the PPV application parameter table listed below, is referenced to determine whether a credit/collections check needs to be conducted for the called application 28 (the Application Parameter Table is populated per each called number).

| PPV APPLICATION PARAMETER TABLE | | |
|---|---|---|
| Field Name | Data Type | Description |
| DNIS | Char (7) | DNIS identifying a specific Cox location or customer, or Pay Per View event (first 3 digits identify site ID) |
| Site ID | Char (3) | 3-digit site identifier used as override for first 3 digits of DNIS (refer to Information Systems Environment) |
| Business Hours CCT | Integer | CCT to transfer callers to during business hours |
| After Hours CCT | Integer | CCT to transfer callers to after hours or on holidays |
| Collections CCT | Integer | CCT to transfer callers to for collections |
| Collections Flag | Char (1) | Y/N flag indicating whether callers are transferred to the Collections CCT if their credit status is unacceptable |
| Alternate Transfer Flag | Char (1) | flag indicating whether to use standard CCTs or to lookup alternate transfer CCT based on flag type in Alternate CCT Table (valid values of flag are null = standard CCT; Z = zip code; N = node ID; P = primary locator code; S = secondary locator code |
| Account Transfer Flag | Char (1) | Y/N flag indicating whether caller must enter an account number to access the Account Balance Inquiry function |
| PPV Adult Flag | Char(2) | null if Adult events not offered; PPV Type Code if Adult is available (corresponds to Adult PPV Type Code) |
| PPV Adult Rating | Char(2) | minimum rating value for ordering Adult events (01-99) |
| PPV Menu Method | Char(1) | method for presenting PPV menu options (valid values are C (continuous: to select event A, press 1; to continue reviewing events, press 2) or D (discrete: for event A, press 1: for event B, press 2; for event C, press 3 . . . ) |
| PPV Menu 1 | Char(2) | 2-character code for event type corresponding to PPV Type Code (PT token); null if menu option not offered |
| PPV Menu 2 | Char(2) | 2-character code for event type corresponding to PPV Type Code (PT token); null if menu option not offered |
| PPV Menu 3 | Char(2) | 2-character code for event type corresponding to PPV Type Code (PT token); null if menu option not offered |
| PPV Menu 4 | Char(2) | 2-character code for event type corresponding to PPV Type Code (PT token); null if menu option not offered |
| PPV Menu 5 | Char(2) | 2-character code for event type corresponding to PPV Type Code (PT token); null if menu option not offered |
| PPV Quantity 1 | Integer | number of PPV events returned from the host per PV1 request for Menu 1 (value 01-99 used in QT token) |
| PPV Quantity 2 | Integer | number of PPV events returned from the host per PV1 request for Menu 2 (value 01-99 used in QT token) |
| PPV Quantity 3 | Integer | number of PPV events returned from the host per PV1 request for Menu 3 (value 01-99 used in QT token) |
| PPV Quantity 4 | Integer | number of PPV events returned from the host per PV1 request for Menu 4 (value 01-99 used in QT token) |
| PPV Quantity 5 | Integer | number of PPV events returned from the host per PV1 request for Menu 5 (value 01-99 used in QT token) |
| PPV Extra Option Flag | Char(1) | Y/N flag indicating whether or not an "extra" option will be offered after a caller orders a PPV event |
| PPV Confirmation | Integer | determines the method for PPV order confirmation: 0 = no confirmation required-event is always ordered; 1 = hangup is confirm (pr 1/hang to confrm, 2 to cncl);2 = hangup is cancel (pr 1 to confrm, pr 2/hang to cncl) |

Figure 2C:
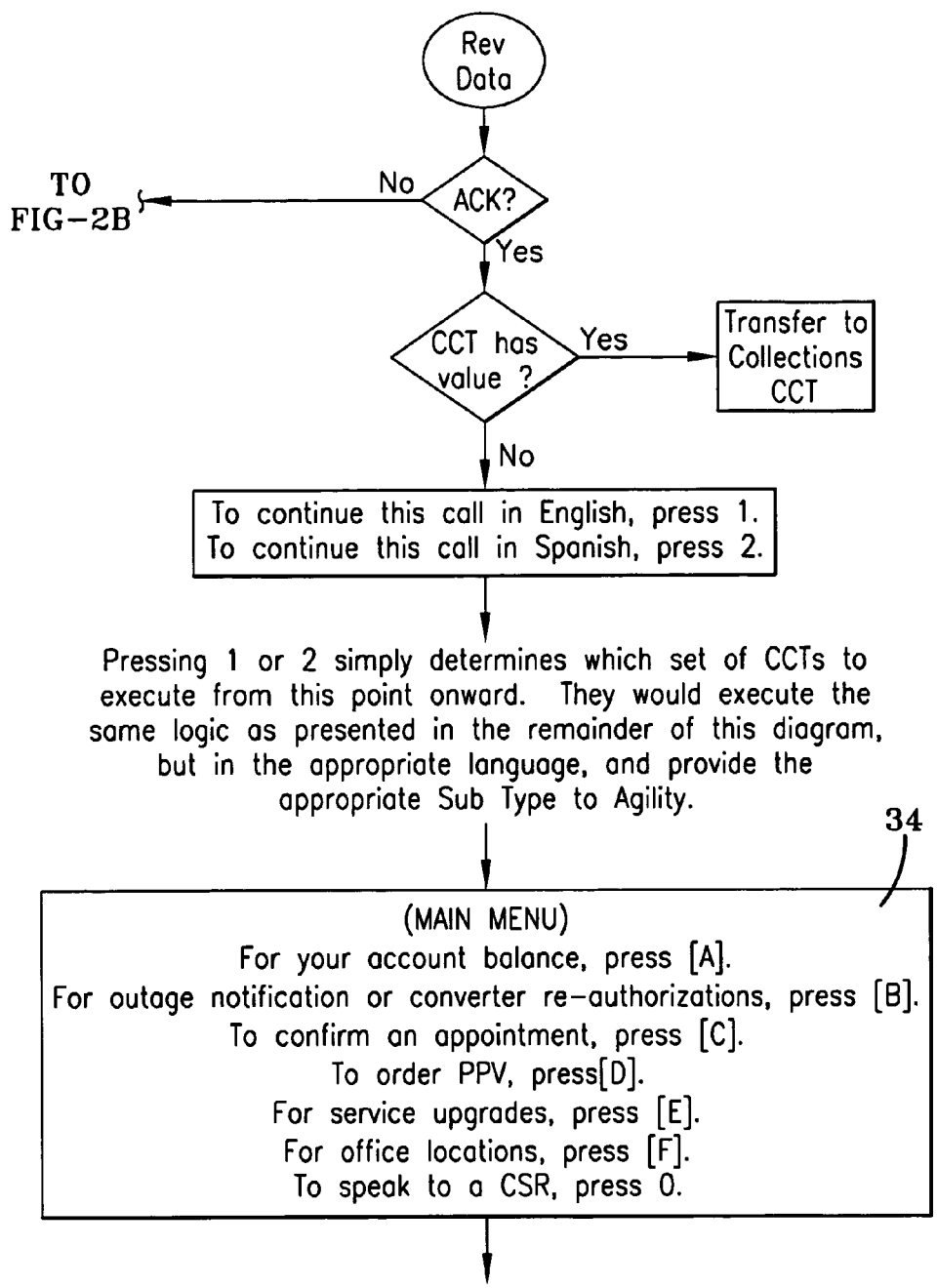

If a collection flag is indicated in the Application Parameter Table, the customers credit CL is retrieved from the temporary storage container to determine whether the caller has bad credit 30. If the caller does have bad credit, the switch is instructed (or a collections status flag is set for the switch) to initiate a collections process 32, which preferably involves transfer of the call to a collections agent (and call data via the data variables). The initial call control process flow of FIG. 2 is specific to the dialed number received at the switch. The dialed number for the call control flow of FIG. 2 relates to a main menu telephone number where the caller is given a menu of choices for further call processing 34. A different initial call control process would be initiated if the caller dialed a number dedicated to ANI based PPV. In such a case, the ANI PPV application on the IVR would be automatically called after the calling customer was validated through the call routing application.

As discussed above, if the calling party's number is located on the data server, customer data from the ICOMS database will be written to the temporary data table for further processing by the IVR; and data will be passed back to the switch to provide the initial call control process with information on how to proceed with the call (e.g., allow the customer to proceed to another IVR application, transfer the caller to a live agent, or transfer the customer to a collections representative). After the Call Routing Application is run, a Parameter Table, such as the Xfer Parameter Table listed below, is referenced to determine whether ANI PPV or MENUPPV selections are offered to the caller by initiating the specific call control process associated with each application.

Xfer_Parameter_Table

This table contains information specific to the routing of callers to the ACD from the Call Routing Application and from all IVR applications. The table is read to determine the appropriate CCT for the transfer. The index key is comprised of DNIS and Language.

| Field Name | Data Type | Description |
| --- | --- | --- |
| DNIS | VarChar(7) | DNIS identifying a specific Cox location or customer type, or Pay Per View event; corresponds to the original DNIS supplied with the call, and subsequently stored in the DTA_Temp_Table ** |
| Language | Char(2) | 2-character code for language of spoken prompts (EN = English or SP = Spanish) |
| Site_ID ** | Char(3) | 3-digit site identifier used as override for first 3 digits of DNIS (for Data Directed Routing purposes only) |
| Business_Hours_Menu | Number(3) | Default CCT number for Main Menu during business hours |
| After_Hours_Menu | Number(3) | Default CCT number for Main Menu after hours or on holidays |
| Business_Hours_CCT | Number(3) | Default agent CCT for call transfers during business hours |
| After_Hours_CCT | Number(3) | Default agent CCT for call transfers after hours or on holidays |
| Collections_CCT | Number(3) | Default CCT for call transfers when the customer account is in a bad credit status this field must always have a value of at least '0' |
| Collections_Flag | Char(1) | Y/N flag indicating whether callers are transferred to the Collections CCT if their credit status is unacceptable |
| Alternate_Xfer Flag | VarChar(10) | Flag indicating whether to use standard transfer CCTs or to lookup alternate transfer CCT based on customer data as specified in the Alternate CCT Table. Valid values are: "default" to use values in Xfer_Parameter_Table "zip-9" for 9-digit zip code (entire ZP token); "zip-5" for 5-digit zip code (first 5 bytes of ZP token); "node" for node ID (ND token); "primary" for primary housing locator code (first 4 bytes of HL token); "secondary" for secondary housing locator code (last 4 bytes of HL token); "application" for call flow specific transfer |
| Alternate_Menu_Flag | VarChar(10) | Flag indicating whether to use standard Menu CCTs or to lookup alternate Menu CCT based on customer data as specified in the Alternate CCT Table. Valid values are the same as those for the Alternate_Xfer_Flag field. |
| Default_Hours_Flag | Char(1) | Y/N flag indicating whether to use the default business hours (Y) or DNIS-specific business hours (N). Business hours and holidays are stored in the Business_Holiday_Table. |
| Default_Holiday_Flag | Char(1) | Y/N flag indicating whether to use the default holidays (Y) or DNIS-specific holidays (N). Business hours and holidays are stored in the Business_Holiday_Table. |
| Xfer_Call_In_Number | Char(10) | Represents the local or 800 number associated with this DNIS; for reference purposes only. |
| DTA_Long_Lead_Flag | Char(1) | Y/N flag indicating whether or not to execute the Long Lead logic in Data Directed Routing. |

The PPV ordering application of the present invention allows callers to order PPV events by either dialing an event-specific phone number or by selecting an event from a voice prompted menu. As discussed above, the PPV applications are engaged after the initial call control process and call routing application identifies the caller's phone number and retrieves the customer account number and other customer data.

In the preferred embodiment, the switch will call the appropriate PPV application on the IVR (PPVANI/DNIS or PPV-MENU) and pass the caller phone number, account number and called number to the IVR via the Data Variables. The PPV applications running on the IVR will use this data to accomplish the PPV functions according to the present invention. If certain caller status is such that it prevents operation of the PPV application, the call may be transferred to a live agent and data is passed to the agent via Data Variable E. A CTI link may be used to pass the data to the live agent.

If a caller dials an event-specific phone number (ANI PPV application), the IVR will use the called number to validate the event and process the order. If the caller dials into a main customer service number and selects the PPV option, the IVR will use the system settings to prompt the caller through a series of menus for selecting a desired PPV event. The caller may be required to enter a PIN number in order to view certain types of events based on their account profile and system settings.

Figure 3A:
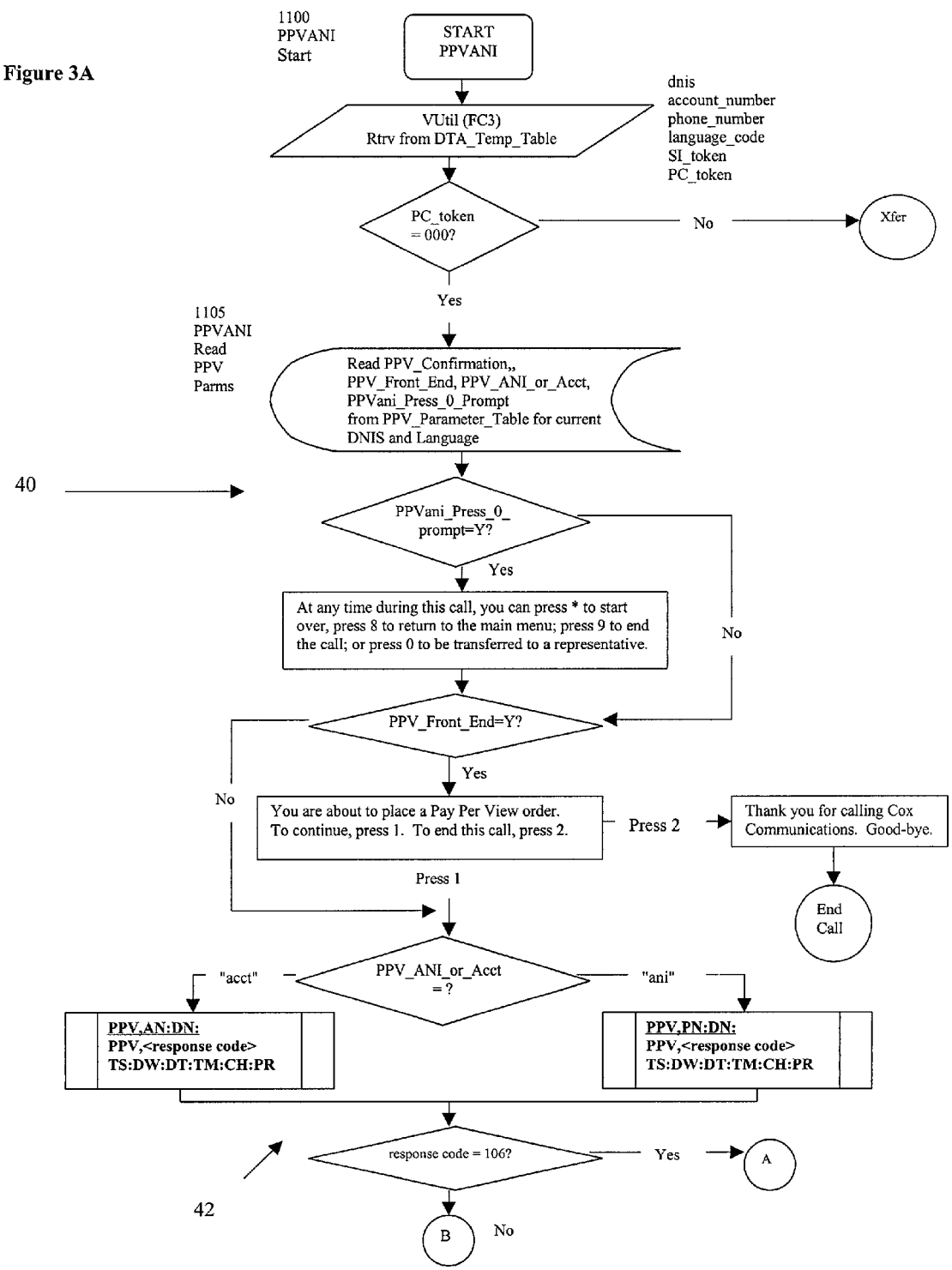
FIGS. 3A-3C illustrate one embodiment of the ANI pay per view (PPV) ordering system of the present invention.
Figure 3B:
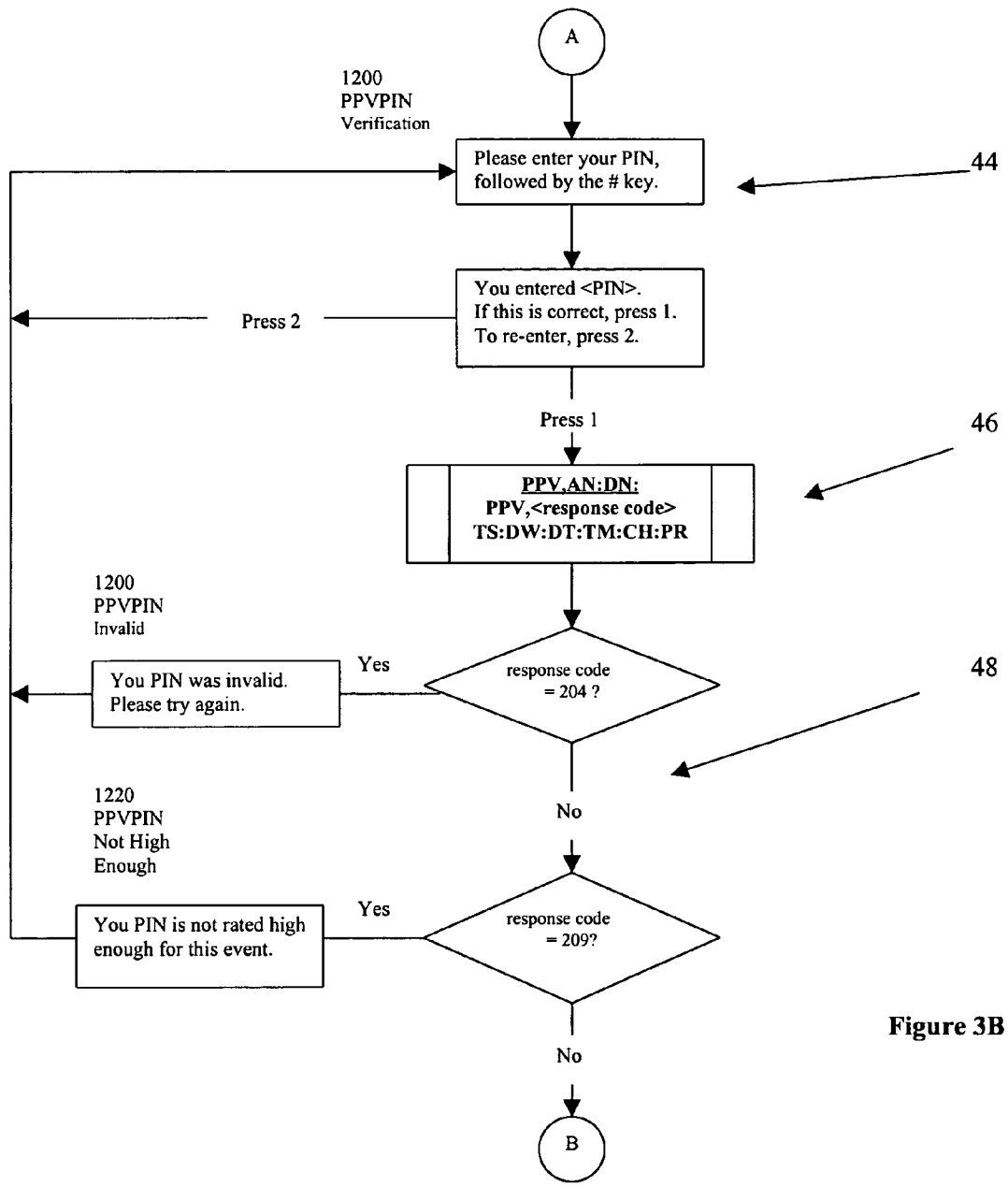
Figure 3C:
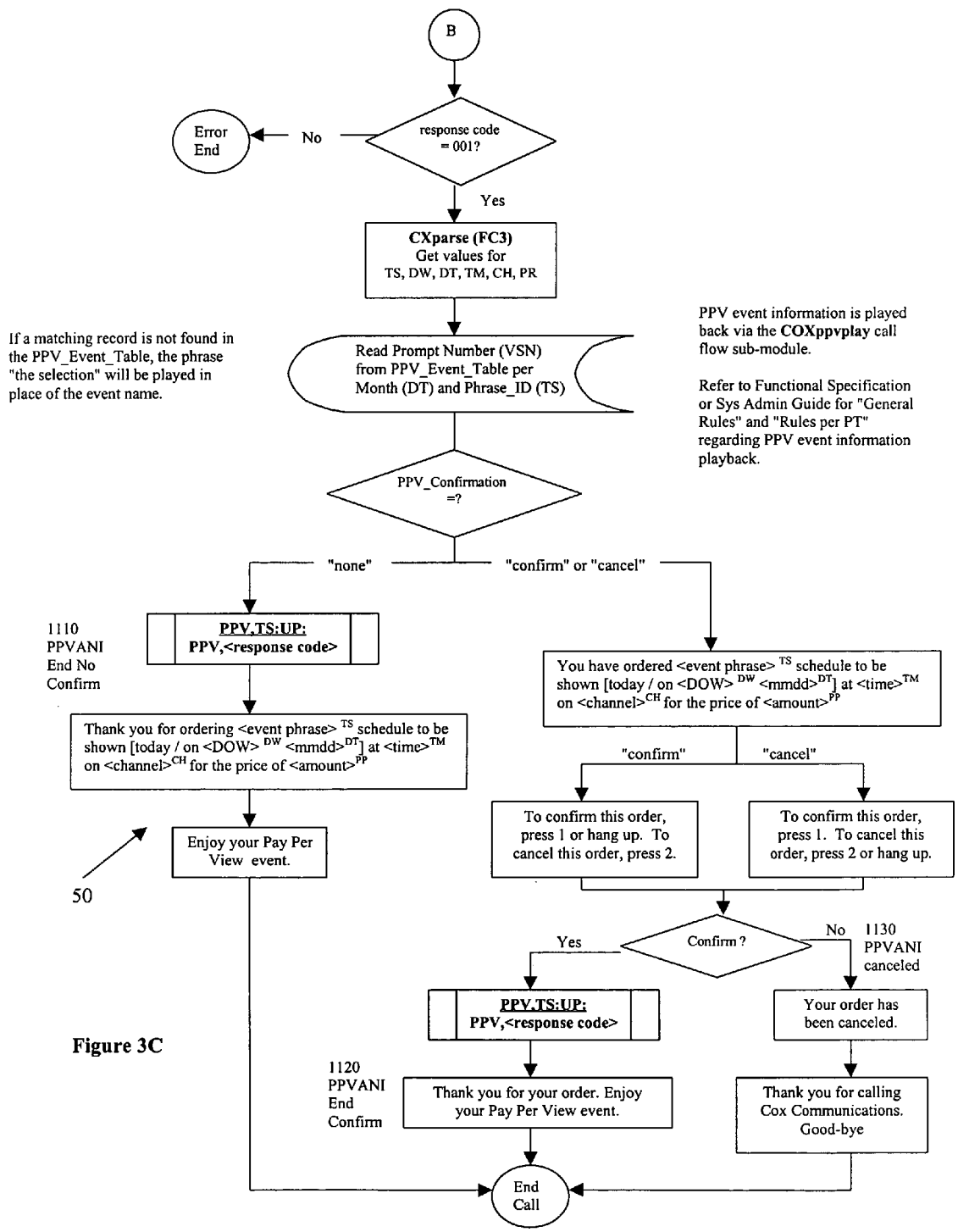
Figure 4A:
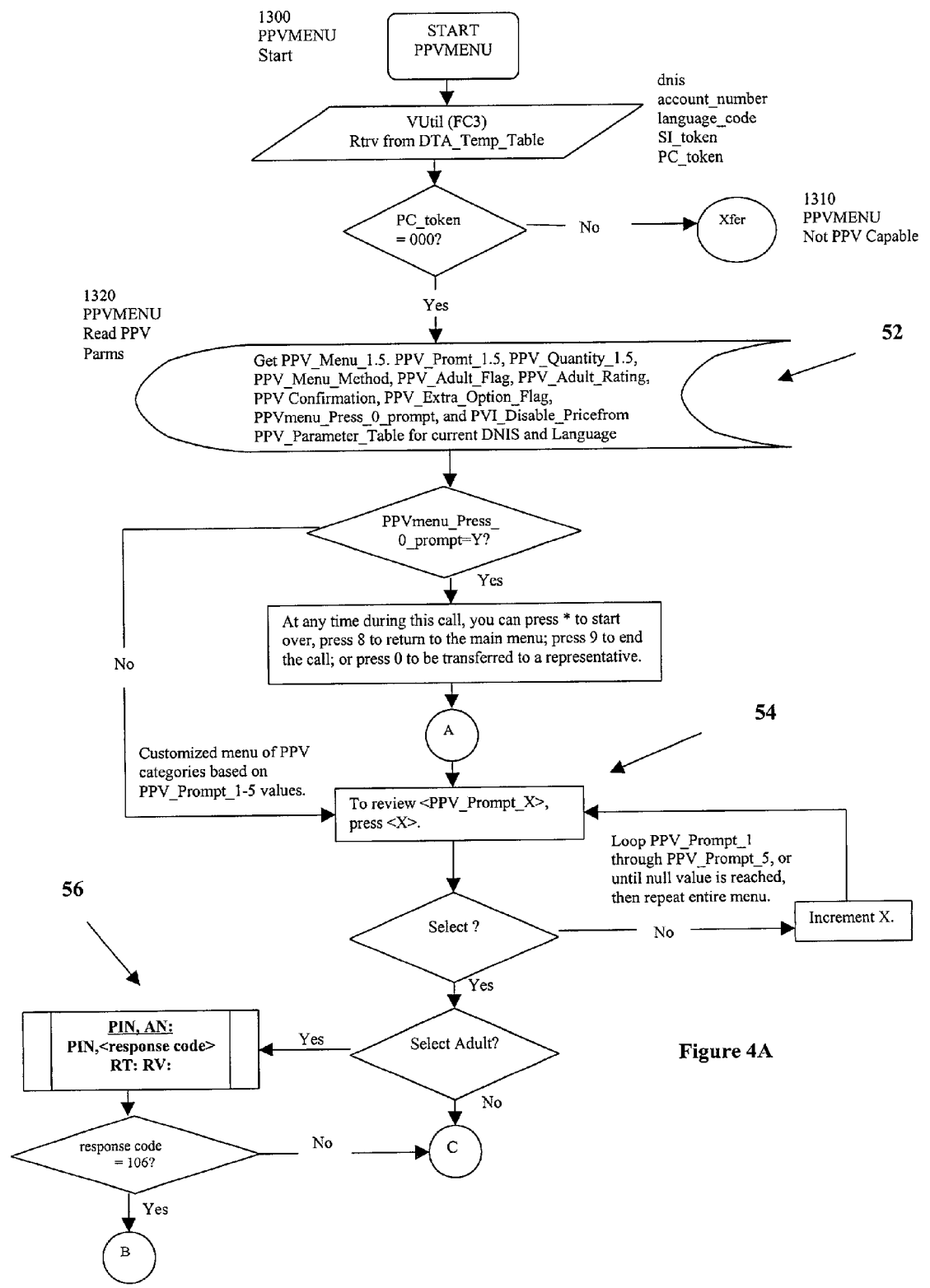
FIGS. 4A-4G illustrate one embodiment of a menu PPV ordering call flow of the present invention.
Figure 4B:
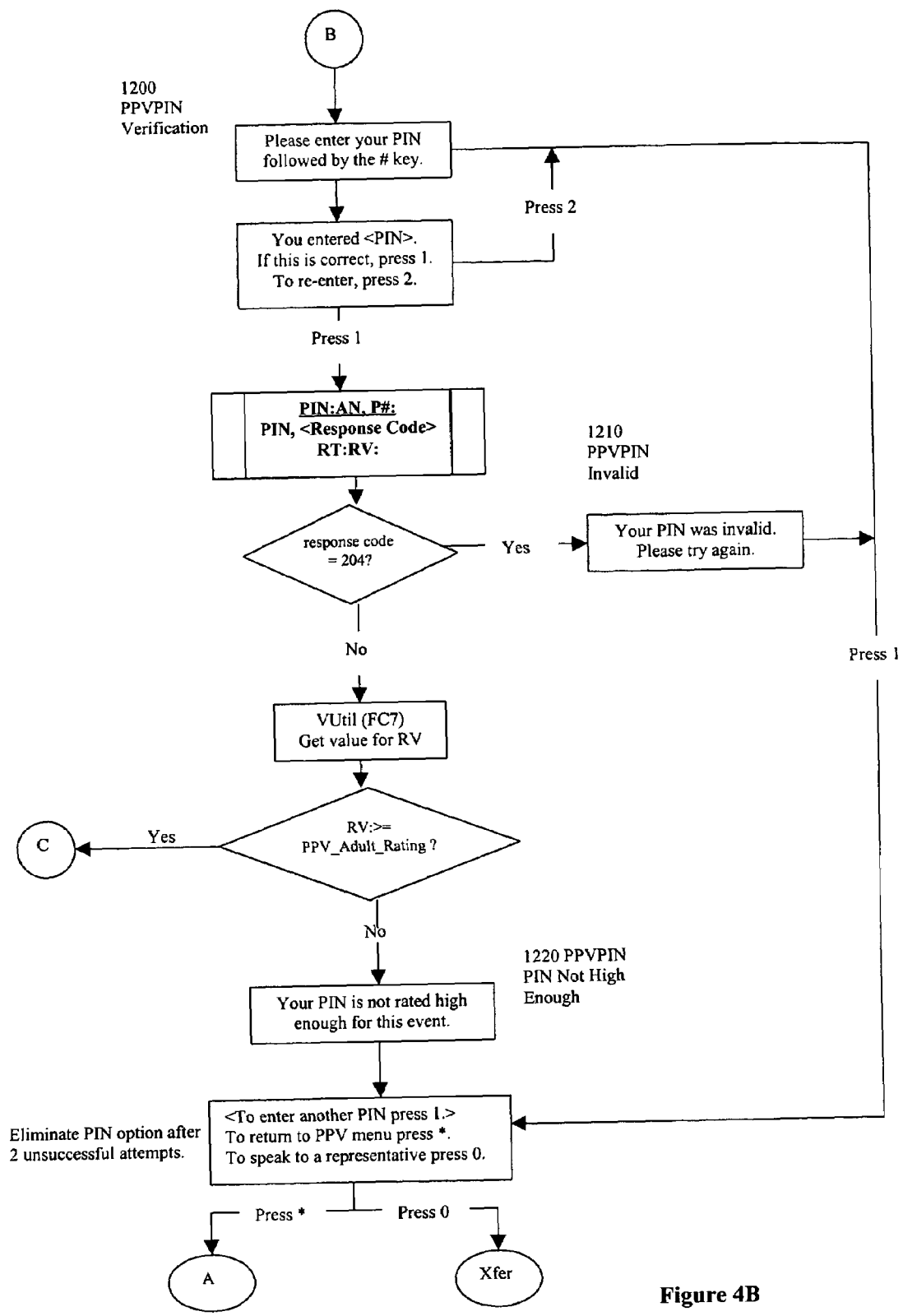
Figure 4C:
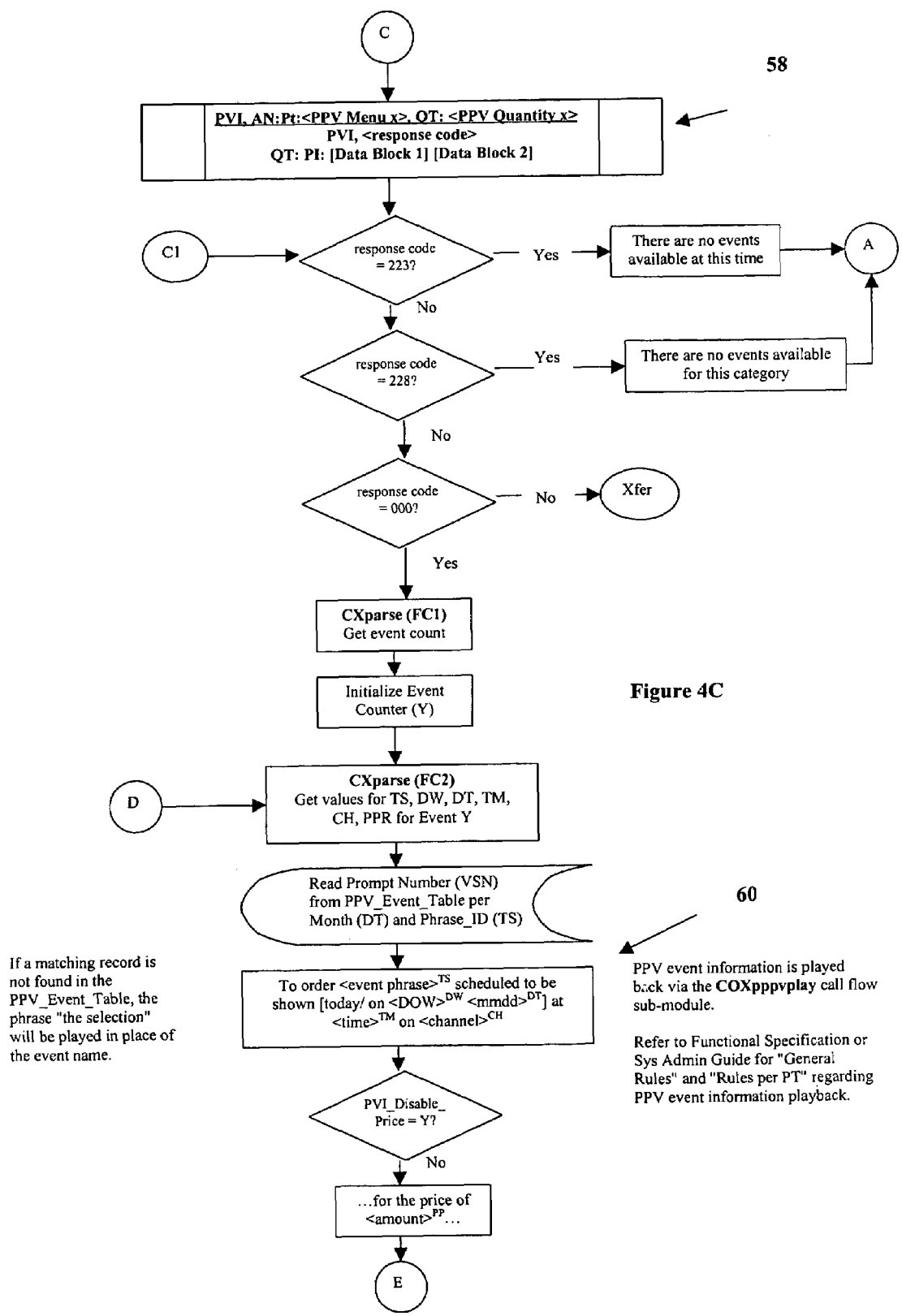
Figure 4D:
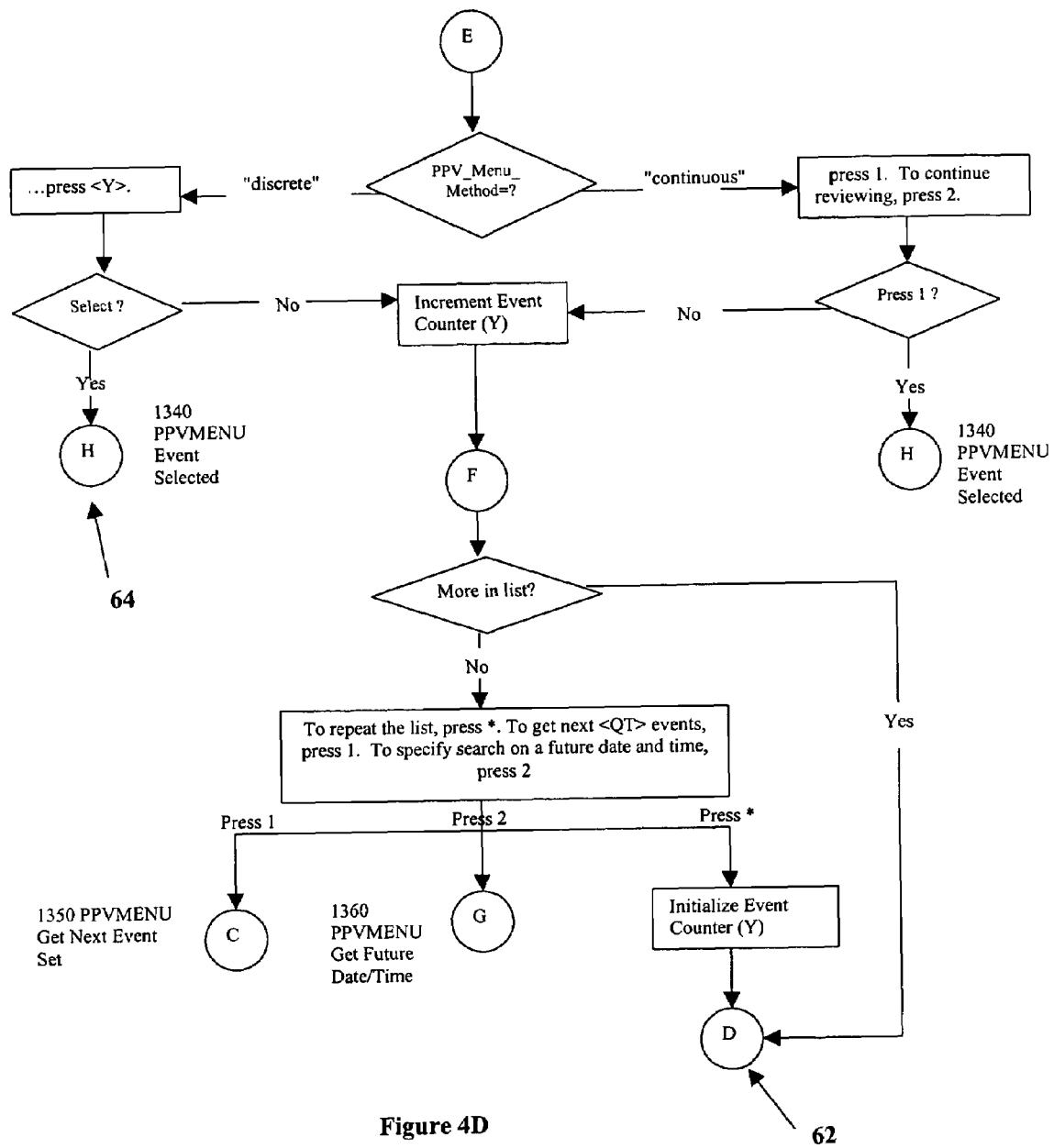
Figure 4E:
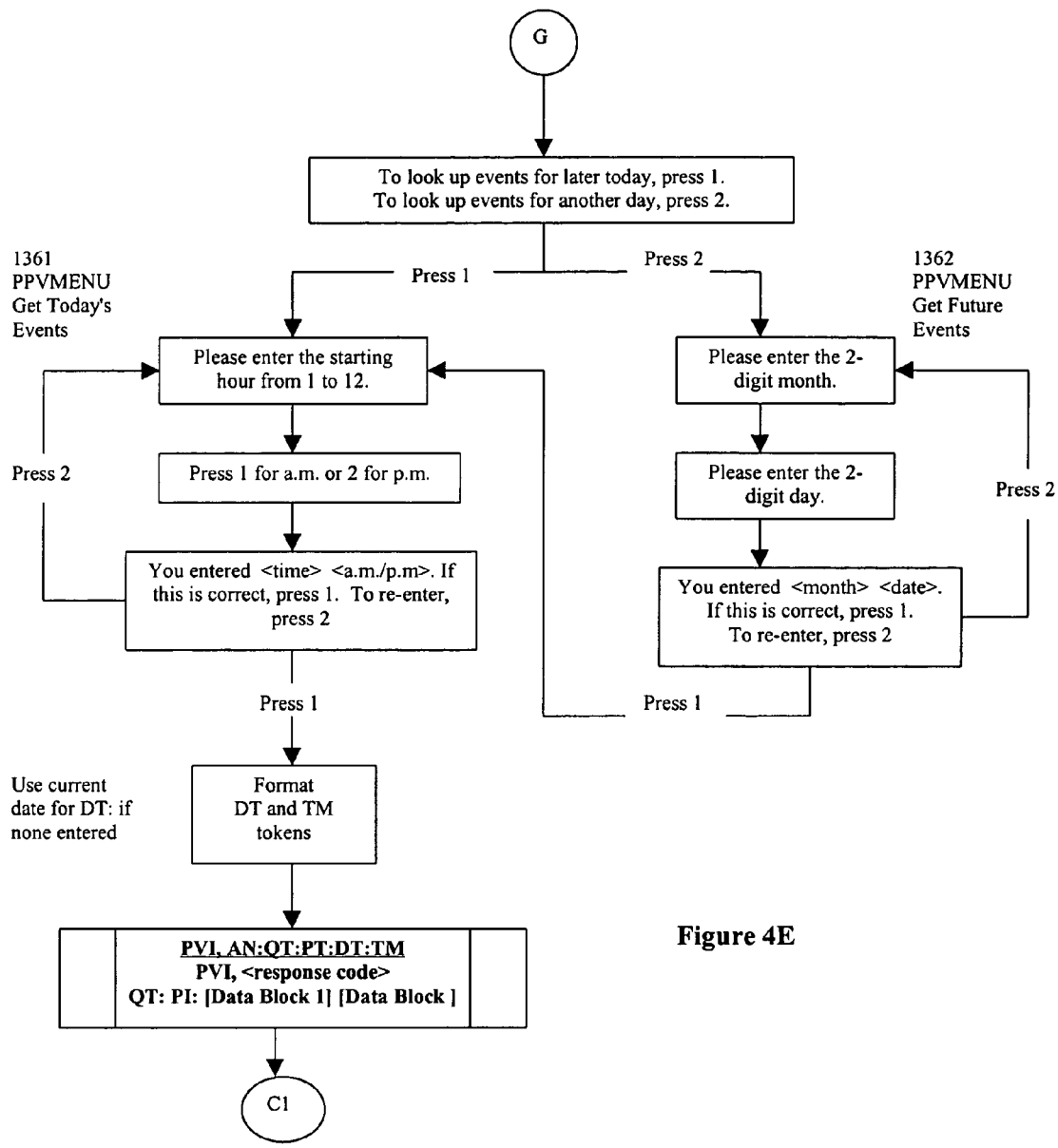
Figure 4F:
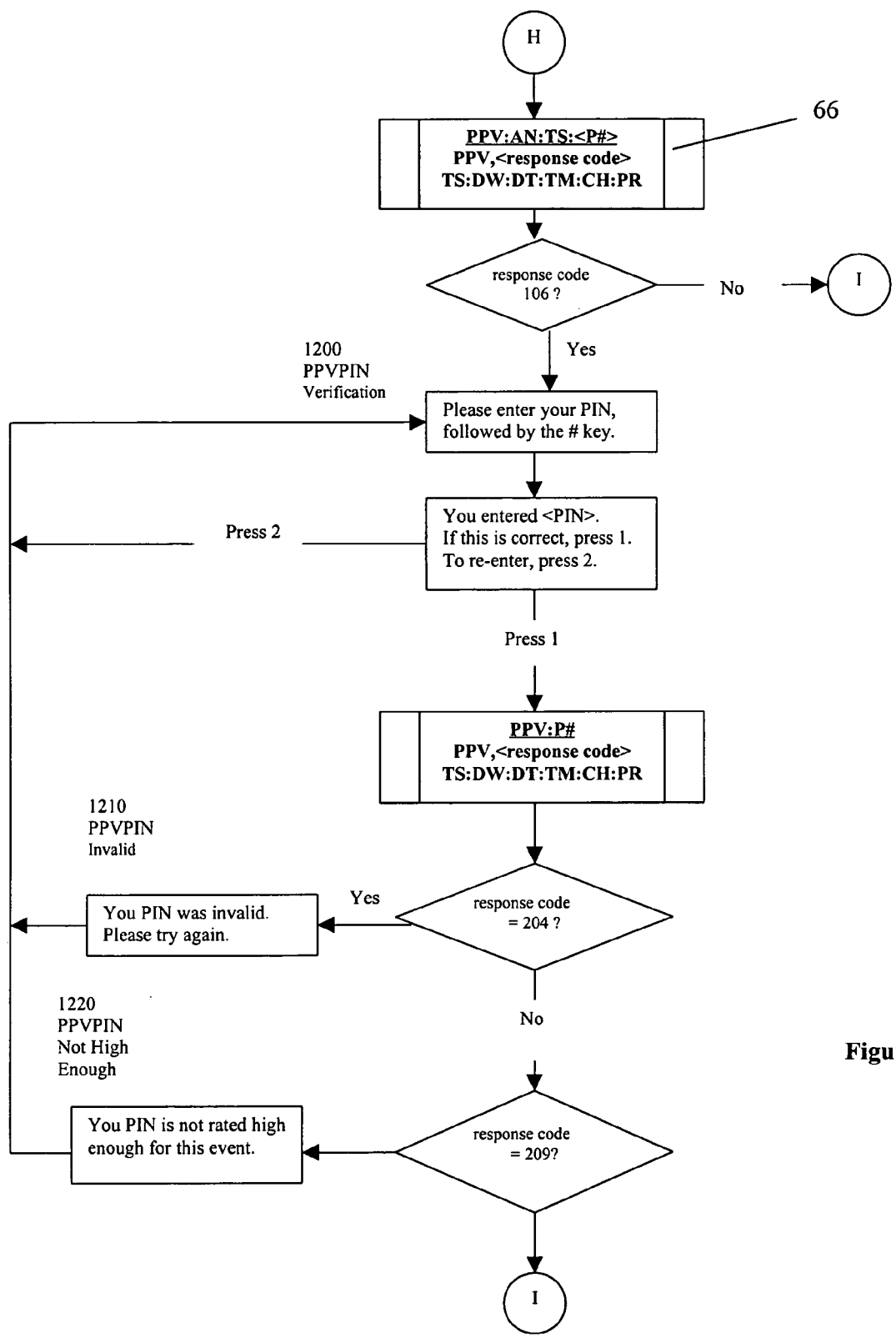
Figure 4G:
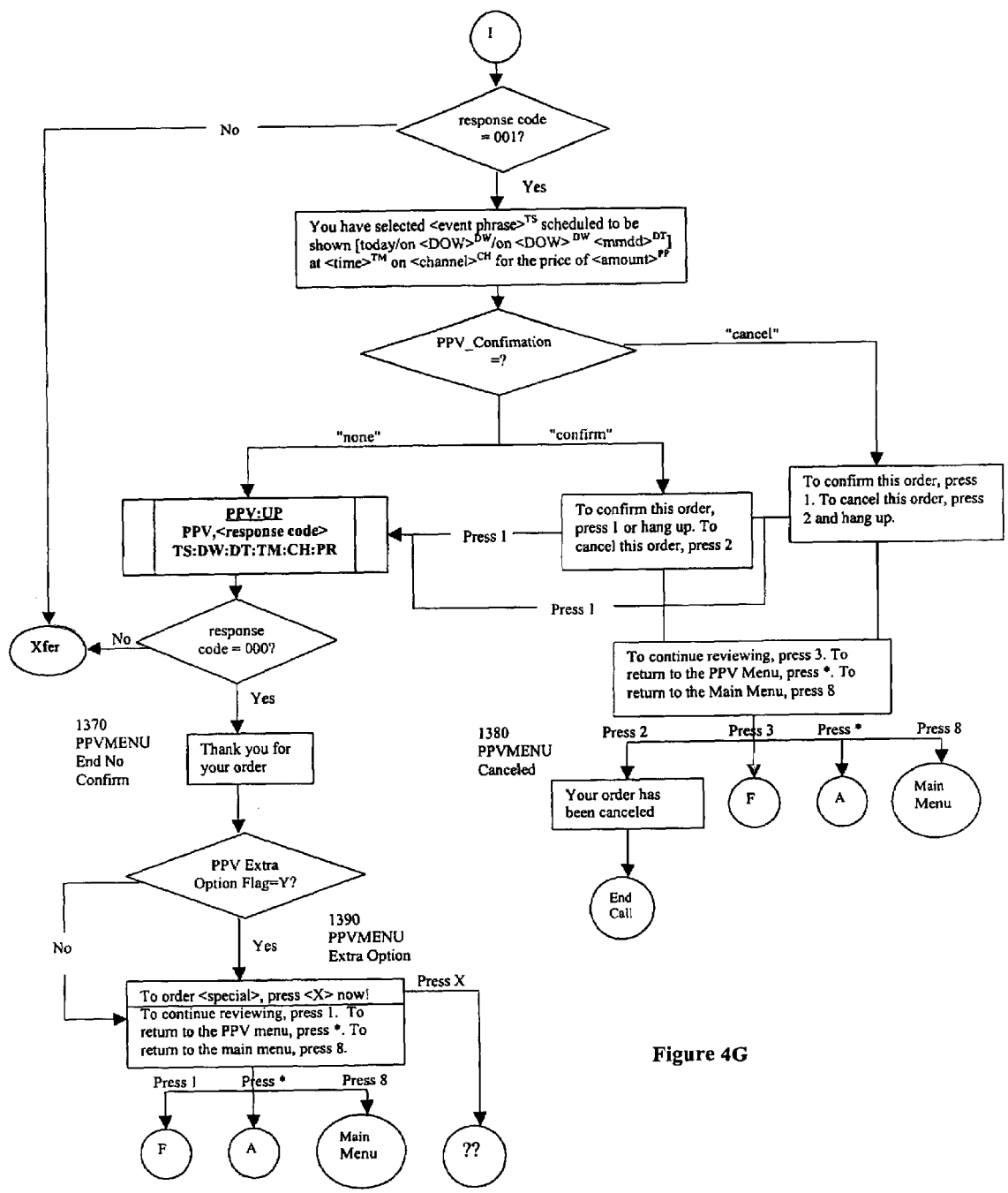

FIGS. 3A-3C illustrate one embodiment of the ANI PPV ordering system of the present invention. The called number PPV ordering process of the present invention uses a PPV Parameter Table that may be set to custom configure the application. The system accesses this PPV Parameter Table to first determine which prompts to play the caller (shown generally at 40).

A PPV data request is sent to the data server 42 to retrieve information relating to the event ordered. If a PIN number is required, the caller is prompted to input it 44 via the touch-tone phone. The PIN number is validated against the customer database 46. In one embodiment, a customer rating system is used wherein each customer and event is assigned a numerical rating number (e.g., higher ratings for adult content material) 48. If the customer's rating is higher than the rating of the requested event, the customer is allowed to receive the event. The feature allows concerned parents to set their ratings lower to prevent their children from viewing adult programming at various levels. Once the customer has been validated, the customer is given a prompt reviewing the details of the event ordered 50.

FIGS. 4A-4G illustrate one embodiment of a menu pay per view ordering call flow of the present invention. The application retrieves customer data from the temporary data storage container and PPV application parameters from the PPV parameter table 52. The caller is played a category menu and is asked to select a category 54. If the adult category is selected, the data server is accessed to obtain the caller's rating based on the caller's PIN 56, see FIG. 4B.

A PPV information request is made to the data server 58 to obtain PPV information. The event information is played to the caller 60 who may select the event desired. If the caller does not wish to order the first-offered event, the application will loop to the next event and prompt the caller with information about the event 62. If the caller wishes to order the event 64, the caller indicates so by the touch-tone phone. The PPV order transaction is sent to the data server 66 (see FIG. 4F) to process the order.

Having shown and described a preferred embodiment of the invention, those skilled in the art will realize that many variations and modifications may be made to affect the described invention and still be within the scope of the claimed invention. Thus, many of the elements indicated above may be altered or replaced by different elements, which will provide the same result and fall within the spirit of the claimed invention. It is the intention, therefore, to limit the invention only as indicated by the scope of the claims.

What is claimed is:

1. A system for ordering a cable television pay-per-view event, said system comprising:
   a switch for receiving calls, said switch adapted to receive a caller's calling number and a called number;
   a data storage component configured with customer information and event information, said customer information including customer account number and calling number data and said event information including a cable television event title;
   a called number table in communication with said switch such that when said calling number is received by said switch, said switch retrieves a customer account number associated with said calling number;
   a temporary data container for storing customer data for use in call processing, said customer data including said customer account number, said temporary data container in communication with said switch and said data storage component; and
   an automatic voice response unit in communication with said switch and said temporary data container, said automatic voice response unit for providing recorded voice response to said caller subsequent to said retrieval of said customer account number, said automatic voice response unit configured with multiple applications, said multiple applications including a called number based pay-per-view application, a menu based PPV application including an alternate transfer flag indicating whether to use standard call control table (CCT) or to lookup alternate transfer CCT based on flag type, and a call routing application wherein said call routing application performs the function of retrieving customer data from said data storage component, wherein said automatic voice response unit receives said customer account number and said called number for use in call processing, wherein said automatic voice response unit requests customer information other than said customer account number and event information from said data storage component; and
   wherein a called number based application retrieves said event from said data storage component using said called number, wherein each event is associated with its own called number, and wherein said customer account number obtained from said calling number is automatically associated with said ordering of said event.

2. A system according to claim 1 wherein said system is configured with called number parameter tables that dictate predetermined call processing based on said called number.

3. A system according to claim 1 wherein said calling number and called number data and caller account number is stored in said temporary data container.

4. A system according to claim 1 further comprising multiple data variables used to hold predetermined data and wherein said data variables are used to transmit data between said switch and said automatic voice response unit.

5. A system according to claim 1 further comprising a live agent station in communication with said switch.

6. A system according to claim 1 wherein said customer information includes credit data.

7. A system according to claim 6 wherein said customer is transferred to a live agent if said customer's credit data represents a bad credit rating.

8. A system according to claim 1 further comprising a PPV parameter table configurable to customize said PPV applications, and wherein said PPV applications reference said PPV parameter table to determine how to process the call.

9. A method for ordering programming events, said method comprising the steps of:
   receiving a call at a switch;
   obtaining a calling number and a called number;
   obtaining an alternate transfer flag indicating whether to use standard call control table (CCT) or to lookup alternate transfer CCT based on flag type;
   retrieving customer data from a database based on said calling number;
   storing said retrieved customer data in a temporary storage location for use during said call; and
   running an automatic voice response application for cable television event ordering wherein said automatic voice response application for ordering is further comprised of the step of retrieving a cable television event from said database based on said called number, wherein said automatic voice response application retrieves additional customer data from said database, wherein each cable television event is associated with its own called number and wherein said customer data includes an account number obtained using said calling number and wherein said automatic voice response application for ordering uses said account number and said called number to retrieve said cable television event and automatically associates said caller's account number with said ordered event.

10. The method of claim 9 further comprising the step of:
receiving a PIN number from a customer and receiving event data including an event rating for an ordered program event;
obtaining a customer rating based on said PIN; and
comparing said customer rating with said event rating to determine whether said customer is allowed to order the event.

* * * * *